Patented Nov. 5, 1929

1,734,130

UNITED STATES PATENT OFFICE

CHARLES H. HOLMAN AND OSCAR W. HOOPPAW, OF ST. LOUIS, MISSOURI

COATING FOR WOOD, METAL, OR OTHER SURFACES AND PROCESS FOR MAKING THE SAME

No Drawing.   Application filed July 22, 1926.   Serial No. 124,286.

This invention relates to improvements in coatings for wood, metal or other surfaces, and to the process for making the same.

An object of the invention is to provide a coating that may be utilized as a paint for wood, metal or other surfaces that shall be waterproof, heat-resistant and impervious to the action of acid.

Another object of the invention is to provide a coating of the class described including a binder formed by the chemical action of a metallic oxide with an aqueous solution of the chloride and sulphate of the same metal, thereby forming a cement base, together with a suitable carrying medium into which pigments may be introduced for forming a paint that may be readily spread upon surfaces by brush or spray method.

Another object of the invention is to provide a process for making a coating as hereinabove characterized.

The base or binder of the coating is formed from the chemical action of a metallic oxide with the aqueous solution of the chloride and sulphate of the same metal. More specifically, the binder includes a combination of calcined magnesia, or magnesium oxide, and a liquid composed of an aqueous solution of magnesium chloride (crystalline) of a specific gravity of 1.1789 (22° Baumé liquids heavier than water at 60° F. temperature) together with an aqueous solution of crystalline magnesium sulphate of similar specific gravity. These solutions may be mixed in various proportions up to three parts, by volume, of magnesium chloride to one part of magnesium sulphate solution.

The volatile oil or drying oil may be a mineral oil, such as petroleum spirits, or heavy naphtha of a specific gravity of 45° to 48° Baumé (liquids lighter than water at 60° F. temperature); or, turpentine may be used alone or in combination with the petroleum spirits or heavy naphtha.

The emulsifying medium may be composed of an oxidizable oil, of either vegetable or animal origin, cooked with ester gum and thinned with naphtha. The emulsifying medium must be such that it will render possible the emulsification of the binder and of the volatile oil; that is to say, it must enable the incorporation of the oil into the binder, to provide for the suspension of the pigments while the coating is in a liquid state.

A suitable emulsifying medium may be a varnish composed of treated Chinawood oil, cooked together with ester gum and thinned with petroleum spirits or heavy naphtha. Any suitable pigments may be added, and it is suggested that the following opaque pigments may be incorporated, namely, zinc oxide or a mixture of varying proportions of barium sulphate and zinc sulphate; a mixture of titanium oxide and barium sulphate, or crystalline pigments such as ground silica or silicon; asbestos, china clay or, indeed, any other of the known pigments commonly used in paints.

The function of the binder is to bind or cement the pigments together and to the surface to which the coating is applied. The purpose of the oil is to suspend the chemical action of the constituents of the binder until the coating is ready for use and spread upon the surface to which it is to be applied. When the coating is exposed to the air, the oil evaporates, permitting the chloride solution to combine with the magnesium oxide to form magnesium oxychloride cement. This binder or base is extremely tenacious and durable.

The method by which the coating is compounded preferably comprises the following procedure. The first step is to mix thoroughly all of the solid ingredients. This would include the mixture of the magnesium oxide with the solid pigments usually in the proportion of one-fourth of the magnesium oxide to three-fourths of pigments. The chloride solution is then added. The proportions of the liquid should be approximately as follows:

Chloride solution

| | Per cent |
|---|---|
| Magnesium chloride | 22 |
| Magnesium sulphate | 1 |
| Water | 77 |

The chloride solution is added to the solids and is stirred to the consistency of a thick paste.

The emulsifier is then added with constant stirring, after which additional petroleum spirits is added slowly with a stirring and whipping motion until the mass is thoroughly emulsified. In ordinary practice the ultimate proportions of the liquids are approximately

| | Per cent |
|---|---|
| Chloride solution | 50 |
| Petroleum spirits | 40 |
| Emulsifier | 10 |

A suitable proportion for the emulsifier given by way of illustrative formula is

| | Per cent |
|---|---|
| Treated Chinawood oil / Ester gum | 90 |
| Petroleum spirits | 10 |

Whenever it is desired to thin the liquid it may be done by the addition of petroleum spirits.

Specially prepared menhaden fish oil has been found to be a suitable substitute either in whole or in part for Chinawood oil, and the addition of linseed oil, up to six per cent, may be made in connection with the emulsifier, adding also a small quantity of drier.

When the coating is finally compounded it will consist approximately of solids seventy-five per cent, and liquid twenty-five per cent.

From the foregoing it will be understood that the advantages of a coating disclosed flow from the fact that the binder is formed from a cement of extremely durable qualities by the action of magnesium chloride solution upon the magnesium oxide. The action between these two ingredients does not occur until the mixture is exposed to air, but when exposed to air the action is complete in from three to twelve hours dependent upon the temperature. The action is delayed so that the product may be stored for a considerable time after mixture by the volatile oil which renders the substance inert. When the coating is spread upon a surface the volatile oil evaporates and allows the constituents of the binder to come in contact and, by chemical action, the oxychloride cement is formed. This base is extremely hard and binds the pigments together and to the surface to which the coating is applied. The binder being of a cement formation after it is once set does not continue to oxydize and will not crumble and thereby release the pigments; but, in use, increases in firmness and hardness.

In order to accomplish the mixture of the volatile oil with the chloride solution, it is necessary to use the emulsifier, which also causes a partial saponification of the mixture. The requirements of the emulsifier is that it must not prevent the chemical action of the binder, and it must itself be of such a nature that it will dry or set hard, and thereby assist in binding the pigments, as well as to render the whole coating acid resistant.

The emulsifier also holds the pigments in suspension and renders the coating as nearly acid-proof as possible. The acid-proofing is accomplished by the binder setting which forces to the surface the combination of Chinawood oil and ester gum, or the other ingredients that may be used as an emulsifier, where it, in turn, sets by oxydation forming a water and acid-proof covering or coating over the binder and pigments.

The characteristics of the ingredients entering into the coating are such that there is little heat transfer through the coating, and a non-inflammable coating is formed on the surface of the object to which the coating is applied. The coating of objects of an inflammable character tends to render the object heat resistant and therefore retards the combuston of the object.

We are aware that the proportion of the ingredients may be varied, and that chemically equivalent ingredients may be substituted without departing from the spirit and scope of the invention, we do not limit ourselves unessentially, but what we claim and desire to secure by Letters Patent is:—

1. A coating of the class described including a metallic oxide, an aqueous solution of the chloride and sulphate of the same metal whereby a cement base is formed, a volatile oil rendering the base forming ingredients inert, and an emulsifier for mixing the oil with the aqueous solution.

2. A coating of the class described including a metallic oxide, an aqueous solution of the chloride and sulphate of the same metal whereby a cement base is formed, a volatile oil rendering the base-forming ingredients inert, an emulsifier for mixing the oil with the aqueous solution, and pigments incorporated in the coating in liquid state.

3. A coating including magnesium oxide and an aqueous solution of magnesium chloride and magnesium sulphate, a volatile oil, and an emulsifier mixed with said aqueous chloride solution and said volatile oil.

4. The method of preparing a coating of the class described comprising the mixing of magnesium oxide with suitable pigments; then adding by agitation an aqueous solution of magnesium chloride and magnesium sulphate; then adding an emulsifier; and then adding a volatile oil.

5. The method of making a coating of the characteristics described comprising a mixture of a metallic oxide with solid pigments; the mixing of said solids by agitation with an aqueous solution of the chloride and sulphate of the same metal; then adding an emulsifier and a volatile oil; and then thinning the mixture to the desired consistency by the addition of a suitable hydrocarbon thinner.

CHARLES H. HOLMAN.
OSCAR W. HOOPPAW.